US011925871B2

(12) United States Patent
Brown et al.

(10) Patent No.: US 11,925,871 B2
(45) Date of Patent: Mar. 12, 2024

(54) COMPETITOR SELECTION

(71) Applicant: BRITISH TELECOMMUNICATIONS PUBLIC LIMITED COMPANY, London (GB)

(72) Inventors: Ruth Brown, London (GB); Jonathan Hart, London (GB); Maria Cuevas Ramirez, London (GB); Svilen Mirtchev, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 167 days.

(21) Appl. No.: 17/598,805

(22) PCT Filed: Mar. 9, 2020

(86) PCT No.: PCT/EP2020/056171
§ 371 (c)(1),
(2) Date: Sep. 27, 2021

(87) PCT Pub. No.: WO2020/193108
PCT Pub. Date: Oct. 1, 2020

(65) Prior Publication Data
US 2022/0184503 A1      Jun. 16, 2022

(30) Foreign Application Priority Data

Mar. 28, 2019   (EP) .................................. 19165820

(51) Int. Cl.
*A63F 13/795*   (2014.01)
*A63F 13/332*   (2014.01)
(Continued)

(52) U.S. Cl.
CPC .......... *A63F 13/795* (2014.09); *A63F 13/332* (2014.09); *A63F 13/358* (2014.09);
(Continued)

(58) Field of Classification Search
CPC ...... A63F 13/795; A63F 13/332; A63F 13/30; A63F 13/35; A63F 2300/5566; H04W 24/08; H04W 48/18; H04L 67/131
(Continued)

(56) References Cited

U.S. PATENT DOCUMENTS 5,828,843 A  *  10/1998  Grimm .................. G06F 9/5044
                                                               709/204
8,149,530 B1     4/2012  Lockton et al.
(Continued)

FOREIGN PATENT DOCUMENTS

GB          2580595 A  *  7/2020 ........... A63F 13/358
WO       2015/081022         6/2015
(Continued)

OTHER PUBLICATIONS

"Network Fairness—Team Autobalancing", Novelty Search Report, Topic—A33763, Stellarix Consultancy Services, Oct. 25, 2018, 25 pages.
(Continued)

*Primary Examiner* — Michael A Cuff
(74) *Attorney, Agent, or Firm* — Nixon & Vanderhye P.C.

(57)  ABSTRACT

A method of selecting competitors for a multi-user competitive activity being performed over a telecommunications network, in which a first UE and a second UE are in communication with the telecommunications network, and the telecommunications network providing at least one network slice, wherein the method comprises the steps of: identifying a network slice onto which the first UE is allocated; identifying a network slice onto which the second UE is allocated; determining that the first UE and the second UE are intending to participate in the multi-user competitive activity; and selecting the first UE and the second UE to participate in the multi-user competitive activity in depen- (Continued)

Figure 1:
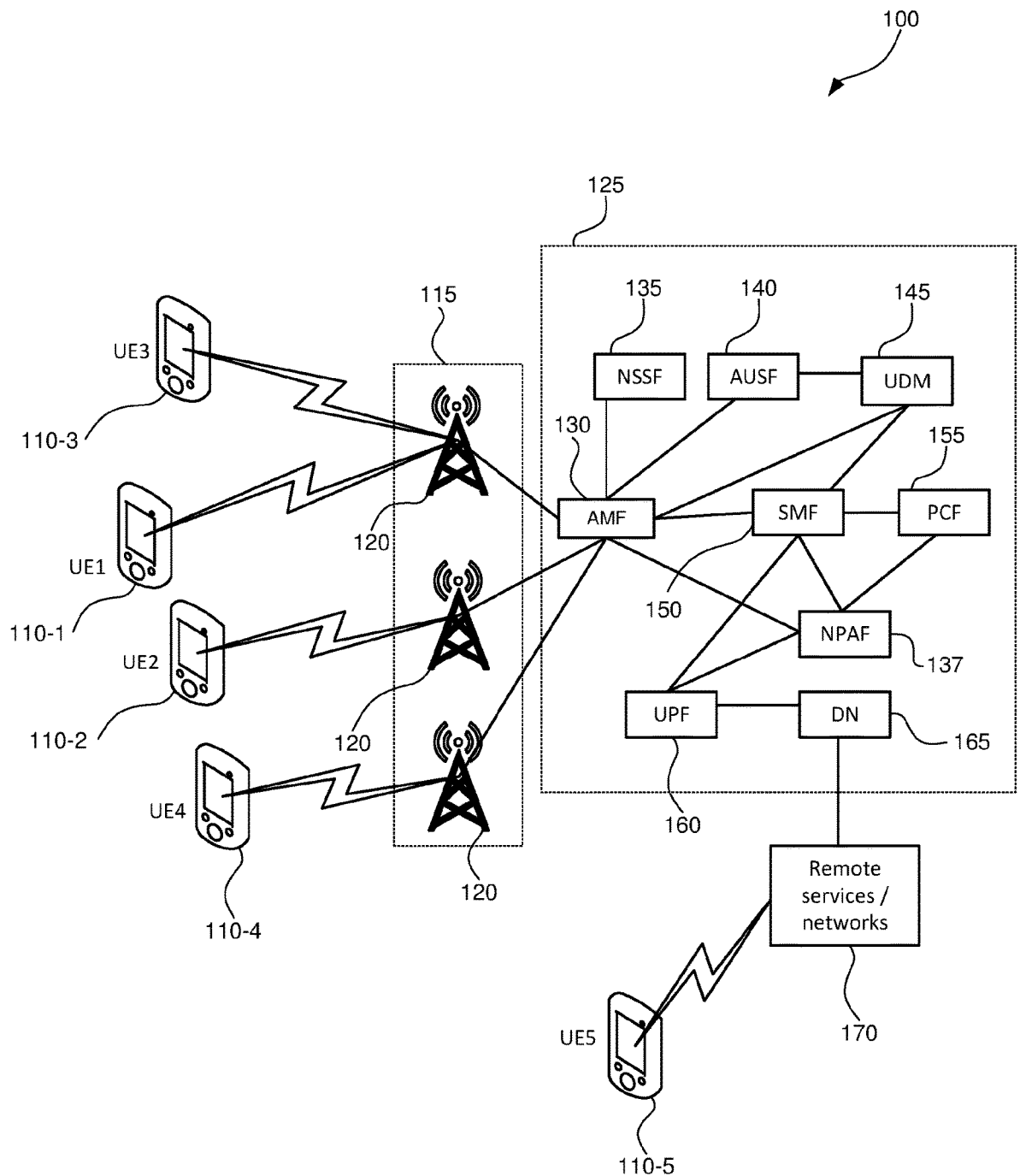

dence on the identified network slices onto which the first UE and the second UE is allocated.

21 Claims, 3 Drawing Sheets

(51) Int. Cl.
 *A63F 13/358* (2014.01)
 *H04W 24/08* (2009.01)
 *H04W 48/18* (2009.01)
(52) U.S. Cl.
 CPC ........... *H04W 24/08* (2013.01); *H04W 48/18* (2013.01); *A63F 2300/5566* (2013.01)
(58) Field of Classification Search
 USPC .......................................................... 463/42
 See application file for complete search history.

(56) References Cited

U.S. PATENT DOCUMENTS

| | | |
|---|---|---|
| 10,070,344 B1 | 9/2018 | Dowlatkhah et al. |
| 2003/0204565 A1 | 10/2003 | Guo et al. |
| 2006/0258463 A1 | 11/2006 | Cugno et al. |
| 2009/0098918 A1 | 4/2009 | Teasdale et al. |
| 2011/0022709 A1 | 1/2011 | Xu |
| 2014/0274403 A1 | 9/2014 | Anastasopoulos |
| 2016/0001181 A1 | 1/2016 | Marr et al. |
| 2017/0257870 A1 | 9/2017 | Farmanbar et al. |
| 2017/0303259 A1 | 10/2017 | Lee et al. |
| 2018/0065048 A1 | 3/2018 | Lebrun et al. |
| 2020/0259896 A1* | 8/2020 | Sachs ...................... H04L 67/10 |
| 2020/0374034 A1* | 11/2020 | Xu ........................ H04L 1/0057 |

FOREIGN PATENT DOCUMENTS

| | | |
|---|---|---|
| WO | 2018/135105 | 7/2018 |
| WO | 2018/136105 | 7/2018 |
| WO | WO-2019075479 A1 * | 4/2019 ......... H04L 41/0806 |

OTHER PUBLICATIONS

Sebastian Zander, et al., "Achieving Fairness in Multiplayer Network Games through Automated Latency Balancing", 2005, 8 pages.
Extended European Search Report for EP Application No. 19165820.2 dated Sep. 6, 2019, 9 pages.
International Search Report and Written Opinion of the ISA for PCT/EP2020/056171 dated Apr. 21, 2020, 13 pages.
Combined Search and Examination Report dated Aug. 14, 2019 issued in GB Application No. GB1904304.1 (7 pages).
Office Action dated Dec. 27, 2022 issued for Chinese Application No. 202080021473.3 (9 pages).
European Examination Reported dated Feb. 6, 2023 issued for European Application No. 20 708 500.2 (9 pages).
Communication pursuant to Article 94(3) EPC dated Jun. 23, 2023, issued for European Application No. 20 708 500.2 (5 pages).
Office Action dated Jun. 1, 2023, issued for Chinese Application No. 202080021473.3 (7 pages).

* cited by examiner

COMPETITOR SELECTION

This application is the U.S. national phase of International Application No. PCT/EP2020/056171 filed Mar. 9, 2020 which designated the U.S. and claims priority to EP Patent Application No. 19165820.2 filed Mar. 28, 2019, the entire contents of each of which are hereby incorporated by reference.

FIELD OF INVENTION

The present invention relates to a method of selecting competitors for a multi-user competitive activity being performed over a telecommunications network, and in particular so as to improve fairness; the present invention also relates to a telecommunications network therefor.

BACKGROUND

Network performance (e.g. bandwidth, latency, jitter, etc.) amongst users of a network can vary greatly; this may (all things otherwise being equal) result in unfair conditions amongst users that are engaged in a competitive activity over the network (such as gaming, auctions, voting, gambling/betting, financial trading, etc.) or that use the network to support a competitive activity (such as a sporting competition).

Such unfair conditions may influence the outcome of a competitive activity and/or negatively affect users' mutual enjoyment of the competitive activity. For example, in a competitive activity being performed over a network, pitting a user that has a far better network connection against another user that has a far worse network connection may be deemed unfair, since the former may receive information before the latter, thereby gaining a competitive advantage, not least, by being able to react sooner to new information. It is therefore an aim of the present invention at least to alleviate the aforementioned problem.

STATEMENTS OF INVENTION

According to a first aspect of the present invention, there is provided a method of selecting competitors for a multi-user competitive activity being performed over a telecommunications network, in which a first UE and a second UE are in communication with the telecommunications network, and the telecommunications network providing at least one network slice, wherein the method comprises the steps of: identifying a network slice onto which the first UE is allocated; determining that the first UE and the second UE are to participate (optionally, are intending to participate or are currently participating) in the multi-user competitive activity; and selecting the first UE and the second UE to participate in the multi-user competitive activity in dependence on the identified network slices onto which the first UE and the second UE is allocated. Preferably, said selecting is performed in dependence upon a comparison of the identified network slices.

As used herein, the term "allocated" with reference to allocation of a UE to a network slice, preferably connotes: the identification or selection of a network slice onto which to connect the UE, but where the UE has not yet—but is to be—connected to a network slice; where the UE is connecting to the network slice; and/or where the UE is already connected to the first network slice.

As used herein, the term "to participate", in the context of the multi-user competitive activity connotes anticipated or ongoing participation in the multi-user competitive activity.

As used herein, the term "selecting" with reference to selecting the first UE and the second UE to participate in the multi-user competitive activity preferably connotes identifying the first and the second UEs and/or permitting the first and the second UEs together to participate in the competitive activity.

As used herein, the term "user" preferably connotes a human user (and/or a subscriber/user account or profile associated with said human user) and/or a UE used by (or associated with) said human user, and therefore the terms UE and user may effectively be interchangeable, as appropriate. Optionally, the second UE is not allocated to a network slice.

Optionally, identifying a network slice comprises identifying: a unique identifier associated with a network slice; a type of network slice; a guaranteed network performance of a network slices; a computational load of a network slice; a predetermined ranking or scoring of a network slice; upcoming or ongoing reconfiguration of a network slice.

Optionally, the identifying, determining and/or selecting is performed by: the telecommunications network, and in particular by a core of the telecommunications network; the first UE; the second UE; and/or by a remote network and/or server that is hosting the multi-user competitive activity.

Optionally, the identity of the network slice to which the first UE is allocated is communicated to the remote network and/or server that is hosting the multi-user competitive activity so as subsequently to perform the selecting. Optionally, the telecommunications network is a local or wide area network. Optionally, the network is a wired (fixed) and/or a wireless network. Optionally, the telecommunications network is a mobile cellular or satellite-enabled network.

Optionally, the first and the second UEs are competing over the network at the same time. Optionally, the first and the second UEs are competing over the network at different times. Optionally, network performance of the second UE is measured, and said network performance is compared to the network slice of the first UE, and the selecting is performed in dependence on said comparison.

According to another aspect of the invention, there is provided a method of allocating competitors to a team of a multi-user competitive activity, the competitive activity comprising at least two teams, and in which a first UE and a second UE are in communication with the telecommunications network, wherein the method comprises the step of: identifying a network slice onto which the first UE is allocated; determining that the first UE and the second UE are to participate in the multi-user competitive activity; and allocating the first UE and the second UE to the at least two teams in dependence on the identified network slice onto which the first UE is allocated.

Preferably, the method further comprises the step of identifying a network slice onto which the second UE is allocated. Alternatively, the first UE and the second UE may be prevented from participating in multi-user competitive activity in dependence on the identified network slice onto which the first UE and/or the second UE is/are allocated. Preferably, said selecting is performed in dependence on the identified network slice onto which the second UE is allocated.

Preferably, the first and the second UEs are identified as being allocated to different network slices. Preferably, the first and the second UEs are identified as being allocated to different types of network slices. As used herein, a "type" of network slice preferably connotes a network slice that may be categorised in dependence on the service it is configured to deliver, for example URLLC and eMMB. Preferably, first and the second UE are identified as being allocated to the same network slice. Preferably, the first and the second UEs are identified as being allocated to the same type of network slice.

Preferably, the method further comprises the step of comparing a first characteristic of the network slice onto which the first UE is allocated to a second characteristic of the network slice onto which the second UE is allocated, and performing said selection in dependence on a result of the comparison. Optionally, the first and second characteristics are identified during the steps of identifying the network slices onto which the first and the second UEs are allocated. Optionally, the selecting is performed in dependence on a result of the comparison complying with a predetermined rule and/or exceeding a predetermined threshold.

Preferably, the competitive activity comprises at least two teams. Optionally, the at least two teams comprise the first and or the second UEs. Optionally, the at least two teams are competing against one another or are competing cooperatively, for example against another team or against AI. Preferably, the method further comprises the step of allocating the first UE and the second UE to a team in dependence on the identified network slice onto which the first UE is allocated. Optionally, the first UE and the second UE are allocated to the same or to different teams. Optionally, said allocating is performed in dependence on the comparison of the characteristics of the first and second network slices.

Optionally, the allocating is performed by: the telecommunications network, and in particular by the core of the telecommunications network; the first UE; the second UE; and/or by the remote network and/or server that is hosting the multi-user competitive activity. Preferably, the method further comprises the step of allocating the first UE and the second UE to a team in dependence on the identified network slice onto which the second UE is allocated.

Preferably, the first UE and the second UE are allocated to different teams in dependence on identifying that the first and second UEs are allocated to the same network slice. Preferably, the first UE and the second UE are allocated to the same team in dependence on identifying that the first and second UEs are allocated to different network slices. Optionally, the method further comprises the step of evenly distributing UEs that are allocated to a given network slice and that are to participate in the multi-user competitive activity across each of the at least two teams. Preferably, said allocating is performed during the competitive activity. Optionally, the allocating is performed prior to the first and the second UEs participating in the competitive activity. Preferably, the method further comprises the step of adapting a network configuration of a network connection of the first and/or the second UE/s in dependence on the identified network slice/s of the first and/or the second UE/s.

Optionally, said adapting is performed in dependence on the identified network slice of the second UE and/or in dependence on a result of the comparison of the network slices. Optionally, said adapting is performed prior to selecting the first and second UEs to participate in the multi-user competitive activity and/or prior to allocating the first and second UEs to a team. Optionally, said adapting is performed so as to select the first and second UEs to participate in the multi-user competitive activity and/or so as to allocate the first and second UEs to a team. Optionally, said adapting further comprises adapting a network configuration of the network connection of the second UE.

Optionally, said adapting comprises: re-allocating to a further network slice; prioritising and/or impeding processing of a network communication; changing a bandwidth allowance; reallocating network resources to and/or from a network slice; changing a path through the telecommunications network of a network communication; changing a location within the telecommunications network of a network resource to be accessed so as to facilitate the multi-user competitive activity; and/or corrupting a network communication.

Optionally, said adapting is performed so as to make more equal network performance for the first and the second UEs. Optionally, the extent and/or frequency of said adapting is limited, and optionally in dependence on the result of the comparison of the network slices. Preferably, the method further comprising the step of identifying the competitive activity. Optionally, identifying the competitive activity is performed by the remote network and/or server Optionally, said adapting is performed in dependence on the identified activity and/or on the identified network slice/s. Preferably, the method further comprises the step of identifying when the first and second UEs are both competing in the multi-user competitive activity and performing the method in response to said identifying. Optionally, identifying when the first and second UEs are both competing in the multi-user competitive activity is performed by the remote network and/or server.

According to yet another aspect of the invention there is provided, a telecommunications network for selecting competitors for a multi-user competitive activity being performed over a telecommunications network, in which a first UE and a second UE are in communication with the telecommunications network, the telecommunications network comprising: at least one network slice onto which the first UE is allocated; a processor configured to: identify that the first UE is allocated to the network slice; and determine that first UE and the second UE are to participate in the multi-user competitive activity; and a controller configured to: select the first UE and the second UE to participate in the multi-user competitive activity in dependence on the identified network slice onto which the first UE is allocated. Optionally, the telecommunications network is further configured to perform the method as described above.

According to still another aspect of the invention, there is provided a telecommunications network for selecting competitors for a multi-user competitive activity being performed over a telecommunications network, in which a first UE and a second UE are in communication with the telecommunications network, the telecommunications network comprising: at least one network slice; a processor configured to: identify the at least one network slice onto which the first and the second UEs are allocated; and determine that first UE and the second UE are intending to participate in the multi-user competitive activity; and a controller configured to: select the first UE and the second UE to participate in the multi-user competitive activity in dependence on the identified at least one network slice onto which the first and the second UEs are allocated.

According to still a further aspect of the invention, there is provided, a telecommunications system for selecting competitors for a multi-user competitive activity, said competitors comprising a first UE and a second UE, and wherein the telecommunications system comprises: a telecommunications network comprising: at least one network slice, and the first and the second UEs being allocated to the at least one network slice; a processor configured to identify the at least one network slice onto which the first and the second UEs are allocated; and a transceiver for communicating with the first UE and the second UE and for communicating the identity of the at least one network slice on to a network location; and a remote server configured to host the multi-user competitive activity, the remote server comprising: a receiver for receiving the identity of the at least one network slice from the transceiver; a processor configured to determine that the first UE and the second UE are intending to participate in the multi-user competitive activity; and a controller configured to select the first UE and the second UE to participate in the multi-user competitive activity in dependence on the received identified at least one network slice onto which the first and the second UEs are allocated.

According to an additional aspect of the invention, there is provided a computer-readable storage medium comprising instructions that, when executed by a processor associated with a telecommunications network, causes the telecommunications network to perform the method described above.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein. Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise. Furthermore, features implemented in hardware may generally be implemented in software, and vice versa. Any reference to software and hardware features herein should be construed accordingly.

Figure 2A:
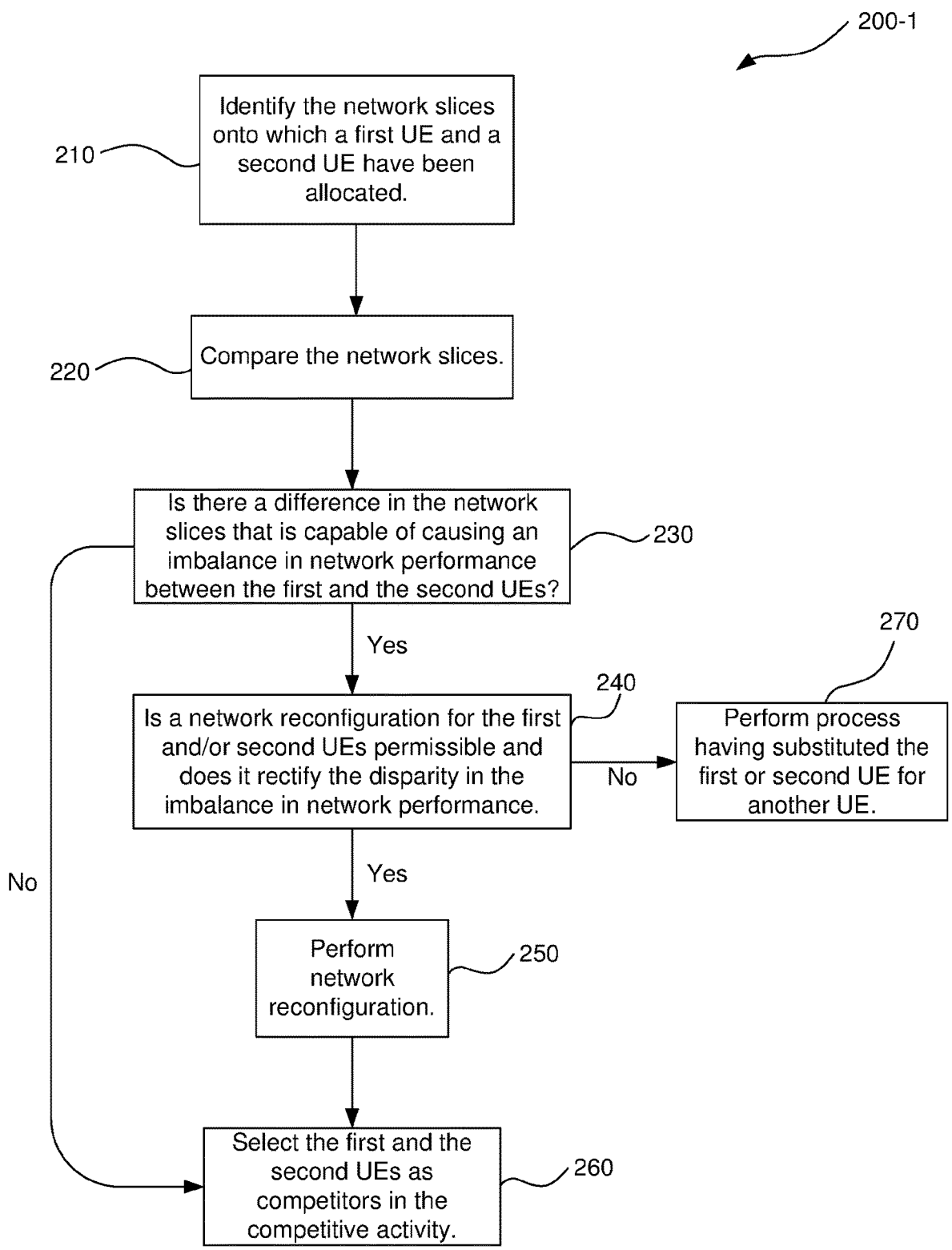
Figure 2B:
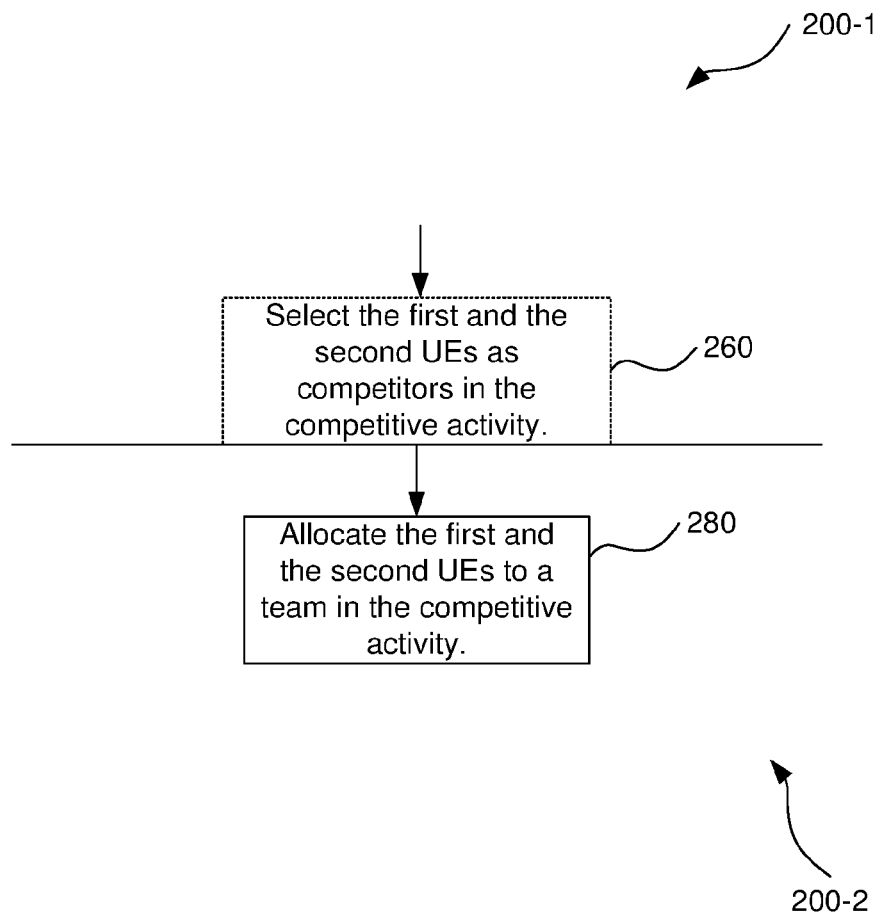

The invention extends to a method of selecting competitors for a multi-user competitive activity, to a telecommunications network and to a computer program as described herein and/or substantially as illustrated with reference to the accompanying drawings. The present invention is now described, purely by way of example, with reference to the accompanying diagrammatic drawings, in which:

FIG. 1 shows an exemplary network; and
FIGS. 2a and 2b shows a process for improving fairness in the network.

SPECIFIC DESCRIPTION

FIG. 1 shows an exemplary telecommunications network 100. The network 100 is a mobile cellular network comprising a plurality of User Equipment (UE) 110 (e.g. in the form of a mobile cellular device, a desktop PC, a games console, a laptop or a tablet). Each UE 110 is configured to utilise the telecommunications network 100 by accessing a Radio Access Network (RAN) 115, as provided by a RAN access point 120 (e.g. in the form of a macro-, micro-, pico- or femto-cell site). In turn, the RAN access point 120 is connected to a core of the network 125.

The core network 125 is available to connect to remote services/network 170, for example in the form of a remote server, other telecommunications networks and/or the Internet. As a result, the plurality of UEs 110-1 to 110-4 are also able to communicate with a UE 110-5 via the remote services/network 170.

The core network 125 in turn comprises the following functional components:
Access and Mobility management Function (AMF) 130;
Network Slice Selection Function (NSSF) 135;
Network Performance Ascertaining Function (NPAF) 137;
AUthentication Server Function (AUSF) 140;
Unified Data Management (UDM) 145;
Session Management Function (SMF) 150;
Policy Control function (PCF) 155;
User Plane Function (UPF) 160; and
Data Network (DN) 165.

By means of the aforementioned functional components, the network 100 provides and manages a plurality of network slices. Network slicing provides a virtualised network comprising multiple logical networks—"network slices"—within a single physical network. This is typically undertaken to offer differentiated service models, which might include varying network performance (including stability) within a network. The NSSF 135 is configured to identify and to select a suitable network slice for UEs.

In overview, UEs 110 that are intending to participate in a competitive activity over the network 100 are selected together to engage in the competitive activity based on the network slice onto which they have been allocated (and therefore, in effect, in consideration of expected network performance deliverable to the UEs) so as to help improve fairness in the competitive activity; FIG. 2 show processes 200 for effecting such a selection.

In particular, FIG. 2a outlines a process 200-1 for operating the network 100 so as to improve fairness for a first UE 110-1 and for a second UE 110-2 that are both (intending to or are already) engaged in a competitive activity over the network 100. In a first step 210, the network slices onto which the first 110-1 and the second 110-2 UEs have been allocated are identified by the NSSF 135 (by means of interfaces with, not least, the UPF 160).

In a next step 220, the identified network slices are compared so as to identify a difference in the characteristics of the network slices and the results of the comparison are subsequently 230 analysed so as to identify whether any such difference is capable of (materially) causing an imbalance in network performance between the first and the second UEs, and therefore to provide a competitive advantage. This is possible, without having to analyse the actual network performance experienced by the UEs, since the configuration of a network slice is a proxy for assessing expected network performance. Step 220 is performed by the telecommunications network 100, and in particular by the NSSF 135, UPF 160 and/or NPAF 137.

At step 230, the analysis as to whether differences in the network slices are capable of (materially) causing an imbalance in network performance includes comparing the extent of the differences in the network slices again a predetermined value such as threshold values and/or rules (e.g. pairings of certain network slices or types of network slices are impermissible).

The differences between the network slices of the first and second UEs that are available to be identified in step 220 include characteristics such as:
- the identity of the network slices (i.e. being different network slices);
- the types of network slices, insofar as the type of service that a network slice is intended to provide (e.g. an Ultra-Reliable Low-Latency Connection (URLLC) network slice or an enhanced Mobile BroadBand (eMBB) network slice (it will be appreciated that two network slices can be different, but of the same type);
- the guaranteed network performance of the network slices (e.g. guaranteeing a minimum, or maximum, extent of network performance, i.e. a level of service), such as predefined thresholds of network performance (e.g. in relation to jitter, latency, bandwidth (download and/or upload), Round-Trip Time (RTT) delay, and error rate);
- the computational load of the network slices and/or anticipated variation of such load with time (e.g. times of day);
- a predetermined ranking or scoring of network slices that is indicative of expected network performance; and/or
- upcoming or ongoing reconfiguration of the network slices (e.g. scaling-up or -down).

Accordingly, if at step 230 it is determined that the differences are capable of (materially) causing an imbalance in network performance, in a next step 240, an assessment is made as to whether or not it is permissible to perform network reconfiguration so as to affect the network performance of the first and/or second UEs so as to improve fairness, thereby to make the network performance of the first and second UEs more equal. Permissibility to perform network reconfiguration is assessed based on, for example: the first and/or second UE/s having opted in to such reconfiguration (e.g. as indicated by a flag that is communicated by the UEs to the network 100 and/or stored within the network 100); and/or the current network performance of a given UE and service obligations to the UE, for example as laid out in a Service Level Agreement (for example, a reconfiguration that improve fairness and that also breaches such a Service Level Agreement would be deemed impermissible). At step 240, it is also assessed whether there is a network reconfiguration that is available to be made that would improve fairness (for example, if the rectification required an increase in processing resources by the network, but no further resources are available, then no such reconfiguration would be available). If both conditions are met, the network reconfiguration is applied 250, and the first and second UEs (having sufficiently equalised their network performance) are selected as competitors 260. Network performance is available to be measured by the NPAF 137 via the UPF 160, SMF 150, PCF 155, and/or AMF 130, with which the NPAF is in communication (either directly or indirectly) via appropriate interfaces.

If, however, no network reconfiguration is permissible or available, then the process 200 proceeds to step 270, in which it is concluded that the first and second UEs are not suitable competitors and are prevented from together participating in the competitive activity. In order not to deny the first and the second UEs from participating in a competitive activity, available alternative UEs are instead considered for selection as a potential competitor for the first and/or second UE/s by substituting the first or second UE with such an alternative UE and then by reiterating process 200-1 with this substitution (in which case two reiterations of process 200-1 may then be performed separately—one for the first UE and an alternative UE, and one for the second UE and yet another alternative UE).

If, however, it is determined at step 230 that the differences between the network slices are unlikely (materially) to cause an imbalance in network performance (indicating, therefore, that the first and second UEs are substantially on an equal footing in terms of network performance), then the process proceeds directly to step 260 such that the first and second UEs are selected as competitors. If it is determined at step 220 that there are no differences in the network slices, and therefore that the first and second UEs are allocated to the same or identical network slice/s, the process proceeds (not shown) directly to step 260 so that the first and second UEs are selected as competitors 260.

The step 260 of selecting the UEs as competitors is performed by the DN 165 and/or by the remote service/network 170 that is facilitating the competitive activity. Accordingly, the result of steps 220, 230, 240, 250 and/or 270 are communicated to the DN 165 and/or to the remote service/network 170 to then effect the selection.

Network Reconfiguration

In more detail, with reference to step 250, the network 100 is reconfigured so as to affect network performance for the first and/or the second UE/s, for example in such a way as to:
- reduce network performance, for example for the first UE 110-1 so as to reduce the effect of the differences between the identified network slices (i.e. where the second UE 110-2 is identified as being allocated to a network slice that is expected to have a worse network performance than the first UE 110-1); and/or
- improve network performance, for example for the second UE 110-2 so as to reduce the effect of the differences between the identified network slices (i.e. where the second UE 110-2 is identified as being allocated to a network slice that is expected to have a worse network performance than the first UE 110-1).

Performing the network reconfiguration so as to reduce the impact of the differences between the identified network slices is performed, for example, by:
- changing the network or part thereof (e.g. a wireless wide area cellular network, a fixed-line network or wireless local area network) over which the first UE 110-1 and/or the second UE 110-2 interact, and in particular changing the network slice onto which the first UE 110-1 and/or the second UE 110-2 are associated, this includes moving:
  - the first UE 110-1 and/or the second UE 110-2 onto:
    - the same network 100, and in particular onto the same network slice; and
    - a different network, and in particular a different network slice.
- changing the path of a network communication from and/or to a given UE 110, including making the network paths for a plurality of UEs:

identical (to the extent possible), including:
registering each UE with the same Mobile Network Operator (MNO) or Internet Service Provider (ISP);
having each UE utilise the same RAN access point 120; and
accessing resources from the same location within the network, such as the same server or node.
different (beyond that inherently necessary), including
performing actions opposite to those outlined above in relation to making the network paths identical.
changing the location, within the network 100, of a resource that both the first and second UEs 110-1, 110-2 are accessing, for example moving resources closer to the network edge, and in particular to a RAN access point 120 used by each UE;
increasing or decreasing the priority with which a network communication associated with a given UE is handled by the network;
reducing or inducing delays in the handling of a network communication associated with a given UE (thereby to change latency and/or jitter), for example by buffering such network communications;
increasing or decreasing bandwidth and/or transfer speeds for a given UE (i.e. throttling); and/or
inducing errors in the handling of network communications (e.g. corrupting data packets) associated with a given UE (thereby to increase error rate).

Any combination of the above-listed methods is used to improve or reduce network performance for a given UE, thereby to help equalise network performance amongst UEs in an effort to improve fairness.

The network configuration for a given UE, and in particular the configuration of a network slice with which a UE is—or is to be—associated, is adapted by the network core 125. In particular, the network configuration is adapted by the AMF 130, SMF 150 and/or the UPF 160, as appropriate.

It will be appreciated that process 200-1 may alternatively be performed with at least three UEs, such that the network slices onto which each of these at least three UEs are allocated are identified and each of these network slices are compared so as then so select whether these at least three UEs are suitable to participate in the competitive activity (or else to replace, and/or to perform a network reconfiguration for, at least one of these UEs).

Team Allocation

In one example, a multi-user competitive activity may involve all participating UEs competing cooperatively (e.g. against an AI-controlled opponent in a game).

In another example, a multi-user competitive activity may involve at least two teams of UEs competing against one another (such as a multiplayer online game). In such examples, the selection of UEs that are to participate in the competitive activity, and then also the allocation of these UEs to teams, are both factors that may affect fairness.

FIG. 2b shows a process for improving fairness in a multi-user team-based competitive activity that is being performed over the network 100.

Process 200-2 comprises the steps of process 200-1 and provides a step 280 that continues from step 260 (in which UEs are selected to participate in a competitive activity).

At step 280, the UEs that are selected to compete in the competitive activity (e.g. the first and second UEs) are then allocated by the network 100 to a team in dependence on the differences in the network slices identified in step 220, and the analysis of the differences identified in step 230. Step 280 is performed by the portion of the telecommunications network 100 that is facilitating the competitive activity (and therefore has knowledge of the requirements of the teams), which is typically the remote service/network 170 (but the core network 125 is available to perform this function).

Allocating UEs to teams includes identifying an arrangement of UEs that fairly distributes the UEs across the teams based on the network slice onto which the UEs have been allocated, instructing said arrangement and/or then effecting said arrangement.

To help illustrate the process of allocating UEs to a team, in one example there are provided four UEs (i.e. the first 110-1 and second 110-2 UEs, as well as a third UE 110-3 and a four UE 110-4) that have been selected to compete in a competitive activity. The competitive activity is a fast-paced online game and requires two equally-populated teams, and the game is provided by a remote service/network 170 in the form of an application server.

In a corresponding manner to the process 200-1, the network slices to which the four UEs 110 have been allocated are identified (by the NSSF 137) and then compared. Table 1 below shows an example of tabulated data identifying the UEs 110 and associating against each UE the network slice onto which they have been allocated.

TABLE 1

| UE | UE IMSI | Network Slice | Network Slice Characteristics |
|---|---|---|---|
| 110-1 | 23476123456789 | Slice A | URLLC |
| 110-2 | 23476123456799 | Slice B | eMBB |
| 110-3 | 23400123456666 | Slice A | URLLC |
| 110-4 | 23476123456777 | Slice D | eMBB |

In Table 1, for each of the four UEs 110, there is provided:
a unique UE identifier in the form of an International Mobile Subscriber Identity (IMSI) number;
a unique identifier for the network slice onto which each UE has been allocated (e.g. "Slice A"); and
a network slice characteristic (or "type") that is indicative of the expected performance of a network slice performance, in which:
URLLC connotes an Ultra-Reliable Low Latency Connection; and
eMBB connotes an enhanced Mobile BroadBand connection.

It will be appreciated that a URLLC connection will typically be expected to facilitate a higher-performance network connection for a fast-paced online game compared to an eMBB connection. Accordingly, based on the information in Table 1, at least in terms of network performance, the first 110-1 and third 110-3 UEs (being allocated to a URLLC network slice) may be expected to have an advantage over the second 110-2 and fourth 110-4 UEs (being allocated to eMBB network slices).

Accordingly, at step 280, the application server (to which the identity of the network slices onto which each of the four UEs are allocated has been communicated from the NSSF 137) allocates the first 110-1 and the third 110-3 UEs to different teams and allocates the second 110-2 and fourth 110-4 UEs to different teams. Accordingly, in one example, the first 110-1 and the second 110-2 UEs are allocated to the same team, whereas the third 110-3 and the fourth 110-4 are together both allocated to another team.

In one example, step 280 is available to reiterate back to step 210 of process 200-1; in this way, UEs may be moved between teams in response to changes to the allocation of UEs to network slices.

In one example, UEs are allocated to different teams when these UEs are allocated to the same network slice (or the same type of network slice), which may therefore balance the distribution of UEs allocated to that network slice (and the UEs are therefore expected to have substantially similar network performances). In addition or alternatively, UEs are allocated to the same team where these UEs are allocated to different network slices (or different types of network slices), which may therefore balance the distribution of UEs that are allocated to these different network slices. In this way, teams may be balanced in terms of the expected network performance of their constituent members.

The processes 200 of selecting competing UEs and/or allocating UEs to teams described above are available to be performed in dependence on the network slice onto which UEs are allocated, and therefore need not require direct measurement of the network performance of UE, since the same may be inferred from known characteristics of the network slices onto which the UEs have been allocated.

In one example, Table 1 further includes data regarding:
a current activity with which a given UE is (or will be) engaged, for example a multiplayer game, an auction, financial trading and voting; and/or
a team (or "opponent group"), for a specific competitive activity, to which a given UE is allocated.

Competitive Activities and Competing UEs

Certain networks (and in particular the applications that they facilitate) allow UEs to engage in activities that do not involve competition amongst various UEs. As a result, it may not be appropriate to attempt to improve fairness as outlined herein for all activities, nor for all UEs.

In such circumstances, the portion of the network that is facilitating the competitive activity (e.g. the remote service/network 170) is configured to distinguish between activities where it is appropriate to improve fairness ("competitive activities") and activities where it is not possible and/or not appropriate to improve fairness ("non-competitive activities"). Accordingly, the network 100 will only improve fairness as outlined herein for such competitive activities, for example where a particular remote service/network 170 instructs it to do so or for a particulate remote service/network 170 that only ever hosts competitive activities.

Examples of competitive activities include: multiplayer games; financial trading; auctions; voting; and data communication that supports a competitive activity and/or "real life" competition (e.g. professional sporting events, such as motor racing).

A non-competitive activity is an activity: with no inherent competition; relating solely to the communication of information that has no ability to affect the outcome of a competitive activity and/or "real life" competition; serving only a single UE; and/or where the outcome is driven solely by chance. Example of non-competitive activities therefore typically include: on-demand streaming of media; single-player gaming; and games purely of chance.

It will be appreciated that, where a network (or an application) restricts access only to competitive activities (such as a private network—or a network slice—dedicated solely to multiplayer online gaming) it is not necessary to differentiate between competitive and non-competitive activities as outlined above.

In certain networks (and/or for certain applications), it is available to differentiate between competing and non-competing UEs, where competing UEs are together and at the same time engaged in the same competitive activity (whether or not against one another).

Identification of sets of competing UEs is performed by the portion of the network that is facilitating the competitive activity (e.g. the remote service/network 170), and the identity of these UEs is therefore communicated to the network 100 so as to facilitate processes 200. The processes 200 described throughout are performed when there are at least two competing UEs.

Alternatives and Modifications

In the aforementioned, the telecommunications network 100 is generally shown and described as a cellular wide area network in accordance with 5G technology. However, in one alternative the telecommunications network 100 is any kind of telecommunications network, including a wired network, a local area network, or combination of network types.

In FIG. 1, the UEs 110 are shown as accessing the same core network. However, it will be appreciated that the UEs can access different core networks (and be connected to one another via the remote network 170).

With reference to FIG. 1, in one alternative, at step 210, only the network slice to which the first 110-1 UE has been allocated is ascertained. For example, only the first UE 110-1 may have been allocated to a network slice, and not the second UE (yet). So as to perform the process a, deduction or (a probabilistic) inference as to the expected network performance, or a measurement of the actual network performance, of the second UE 110-2 is then made so as to then select whether or not the first and second UEs are suitable to compete and/or to allocate the first and second UEs to teams. For example, if the first UE is allocated to a network slice expected to provide by far the best levels of network performance, and the first UE is the only member of this network slice and/or the second UE cannot (due to network rules) be a member of this network slice, then it is deduced that the network performance of the first UE is likely to be materially better than that of the second UE, and so the first and second UEs may not be suitable competitors and/or that balancing teams in view of this expected disparity in network performance may need to be performed.

With reference to FIG. 1, the steps of assessing whether or not it is permissible to perform network reconfiguration 230 and then performing a network reconfiguration 250 are optional; in one alternative, processes 200 proceed without these steps. Instead, a positive determination at step 230 (i.e. that there is a difference in the network slice(s) that is capable of causing an imbalance in network performance between the first and the second UEs) leads directly to step 270.

In one example, instead of—or prior to—adapting the network configuration in response to identifying a disparity in network performance amongst competing UEs, the network instead notifies the competing UE (or at least one of the competing UEs) that there is an unfairness in network performance. An option is then given to the UEs—or at least one of the UEs (such as the UE with the lower/lowest network performance)—for the network to take action so as to improve fairness.

In yet another alternative, the aforementioned processes of improving fairness are performed when competing UEs 110 are used to support a competitive activity (rather than the UEs directly participating in the competitive activity). In one example, the UEs are associated with a competitor that is participating in a sport, and the UEs are used to communicate—over the network—with other competitors, a wider team and/or a referee. In a specific example, the UE is a voice, text or data (including telematics) communication device, and by the aforementioned process fairness can be sought to be improved by, for example, ensuring that competitors are selected and/or allocated to teams based on the network slices to which the UEs are allocated so as to ensure new information pertinent to the outcome of the sport (e.g. team member communications, changes to rules, conditions, race routes, participants, etc.) can successfully reach each UE and/or each team at substantially the same time.

In one alternative, with reference to step 220 of FIG. 2, the process of comparing network slices so as to identify differences that may result in causing an imbalance in network performance is performed remotely to the network core 125, and in particular by the remote service/network 170 and/or the UEs 110 associated with the network slices. This is facilitated by the telecommunications network 100 forwarding to the remote service/network 170 and/or the UEs the identity of the network slices and their characteristics.

In one alternative, the process of selecting competing UEs and/or allocating competition UEs to teams is performed by the telecommunications network 100 (in particular by the network core 125) and/or the UEs 110. Accordingly, to facilitate this process, the network 100 and/or the UEs 110 is/are provided with information regarding the number of teams and the number of UEs per team from the portion of the network that is facilitating the competitive activity.

In one alternative, in order to differentiate between competitive and non-competitive activities, the network 100 identifies (or infers) the activity (explicitly or simply whether or not it is a competitive activity) by inspecting network communications traversing the network 100, for example by assessing the:

- network, transport and/or application layer type and/or values;
- payload data type, format and/or content (e.g. whether it is video, sound, voice, text, image, etc.);
- encryption protocol;
- whether the traffic has been allocated to an activity-specific network slice (such as a low-latency gaming network slice); and/or
- type of UE receiving or sending the network communication (e.g. hardware type and/or operating software version).

In a further example, the network also identifies competing UEs also by inspecting network communications traversing the network 100.

In still another alternative, the process 200-2 of allocating UEs to teams (as per FIG. 2b) is performed without selecting competing UEs in dependence on the network slice onto which the UEs have been allocated. Instead, selection of UEs that are intending to participate in the competitive activity is simply accepted by default.

Each feature disclosed in the description, and (where appropriate) the claims and drawings may be provided independently or in any appropriate combination. Reference numerals appearing in the claims are by way of illustration only and shall have no limiting effect on the scope of the claims.

The invention claimed is:

1. A method of selecting competitors for a multi-user competitive activity being performed over a telecommunications network, in which a first UE and a second UE are in communication with the telecommunications network, and the telecommunications network providing at least one network slice, wherein the method comprises the steps of:
    identifying a network slice onto which the first UE is allocated;
    identifying a network slice onto which the second UE is allocated;
    determining that the first UE and the second UE are intending to participate in the multi-user competitive activity; and
    selecting the first UE and the second UE to participate in the multi-user competitive activity in dependence on the identified network slices onto which the first UE and the second UE is allocated.

2. A method according to claim 1, wherein the first and the second UEs are identified as being allocated to different network slices.

3. A method according to claim 1, wherein the first and the second UEs are identified as being allocated to different types of network slices.

4. A method according to claim 1, wherein the first and the second UEs are identified as being allocated to the same network slice.

5. A method according to claim 1, wherein the first and the second UEs are identified as being allocated to the same type of network slice.

6. A method according to claim 1, further comprising the step of comparing a first characteristic of the network slice onto which the first UE is allocated to a second characteristic of the network slice onto which the second UE is allocated, and performing said selection in dependence on a result of the comparison.

7. A method according to claim 1, further comprising the step of identifying a network performance of the first and/or the second UE/s, wherein said selecting is performed in dependence on the identified network performance/s.

8. A method according to claim 1, wherein the competitive activity comprises at least two teams.

9. A method according to claim 8, further comprising the step of allocating the first UE and the second UE to a team in dependence on the identified network slice onto which the first and/or the second UE/s is/are allocated.

10. A method according to claim 8, wherein the first UE and the second UE are allocated to different teams in dependence on identifying that the first and second UEs are allocated to the same network slice.

11. A method according to claim 8, wherein the first UE and the second UE are allocated to the same team in dependence on identifying that the first and second UEs are allocated to different network slices.

12. A method according to claim 8, wherein said allocating is performed during the competitive activity.

13. A method according to claim 1, further comprising the step of adapting a network configuration of a network connection of the first and/or the second UE/s in dependence on the identified network slice/s of the first and/or the second UE/s.

14. A method according to claim 1, further comprising the step of identifying the competitive activity.

15. A method according to claim 1, further comprising the step of identifying when the first and the second UEs are both competing in the multi-user competitive activity and performing the method in response to said identifying.

16. A non-transitory computer-readable storage medium comprising instructions that, when executed by a processor associated with a telecommunications network, causes the telecommunications network to perform the method according to claim 1.

17. The method according to claim 1, further comprising:
    comparing a network performance of the identified network slice onto which the first UE is allocated to a network performance of the identified network slice onto which the second UE is allocated to identify a difference in network performance of the identified network slices; and in response to determining that the identified difference in network performance complies with a predetermined rule, selecting the first UE and the second UE to compete together within a same multi-user competitive activity.

18. The method according to claim 1, further comprising:
comparing a network performance of the identified network slice onto which the first UE is allocated to a network performance of the identified network slice onto which the second UE is allocated to identify a difference in network performance of the identified network slices; and in response to determining that the identified difference in network performance does not comply with a predetermined rule, reconfiguring the identified network slice onto which the first UE is allocated and/or the identified network slice onto which the second UE is allocated to make the network performance of the first and second UEs more equal.

19. The method according to claim 1, further comprising:
comparing a network performance of the identified network slice onto which the first UE is allocated to a network performance of the identified network slice onto which the second UE is allocated to identify a difference in network performance of the identified network slices; and in response to determining that the identified difference in network performance does not comply with a predetermined rule, determining whether network reconfiguration is permissible;

in response to determining that the network reconfiguration is not permissible, preventing the first and second UEs from participating together in a same multi-user competitive activity.

20. A telecommunications network for selecting competitors for a multi-user competitive activity being performed over a telecommunications network, in which a first UE and a second UE are in communication with the telecommunications network, the telecommunications network comprising:
    at least one network slice;
    a processor configured to:
        identify the at least one network slice onto which the first and the second UEs are allocated; and
        determine that first UE and the second UE are intending to participate in the multi-user competitive activity; and
    a controller configured to:
        select the first UE and the second UE to participate in the multi-user competitive activity in dependence on the identified at least one network slice onto which the first and the second UEs are allocated.

21. A telecommunications system for selecting competitors for a multi-user competitive activity, said competitors comprising a first UE and a second UE, and wherein the telecommunications system comprises:
    a telecommunications network comprising:
    at least one network slice, and the first and the second UEs being allocated to the at least one network slice;
    a processor configured to identify the at least one network slice onto which the first and the second UEs are allocated; and
    a transceiver for communicating with the first UE and the second UE and for communicating the identity of the at least one network slice on to a network location; and
    a remote server configured to host the multi-user competitive activity, the remote server comprising:
        a receiver for receiving the identity of the at least one network slice from the transceiver;
        a processor configured to determine that the first UE and the second UE are intending to participate in the multi-user competitive activity; and
        a controller configured to select the first UE and the second UE to participate in the multi-user competitive activity in dependence on the received identified at least one network slice onto which the first and the second UEs are allocated.

* * * * *